United States Patent
Ji et al.

(10) Patent No.: US 9,631,705 B2
(45) Date of Patent: Apr. 25, 2017

(54) MULTI-STAGES AUTOMATIC TRANSMISSION FOR VEHICLE

(71) Applicant: Hyundai Motor Company, Seoul (KR)

(72) Inventors: Seong-Wook Ji, Whasung-Si (KR);
Jae-Chang Kook, Whasung-Si (KR);
Won-Min Cho, Whasung-Si (KR);
Myeong-Hoon Noh, Whasung-Si (KR);
Kang-Soo Seo, Whasung-Si (KR);
Seong-Wook Hwang, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/723,173

(22) Filed: May 27, 2015

(65) Prior Publication Data
US 2016/0123432 A1    May 5, 2016

(30) Foreign Application Priority Data
Nov. 4, 2014    (KR) .................. 10-2014-0151973

(51) Int. Cl.
*F16H 3/62*   (2006.01)
*F16H 3/66*   (2006.01)

(52) U.S. Cl.
CPC ....... *F16H 3/66* (2013.01); *F16H 2200/0073* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| | | | |
|---|---|---|---|
| 7,614,975 B2 * | 11/2009 | Seo .................. | F16H 3/66 475/278 |
| 7,651,431 B2 | 1/2010 | Phillips | |
| 8,591,376 B1 * | 11/2013 | Shim .................. | F16H 3/66 475/276 |
| 8,591,377 B1 | 11/2013 | Hoffman et al. | |

(Continued)

FOREIGN PATENT DOCUMENTS

DE    102009019046 A1    11/2010
JP    2012-112292    6/2012

(Continued)

OTHER PUBLICATIONS

Search Report dated Mar. 2, 2016 for European Patent Application No. 15168095.6.

(Continued)

*Primary Examiner* — Robert A Siconolfi
*Assistant Examiner* — Ryan Dodd
(74) *Attorney, Agent, or Firm* — Morgan, Lewis & Bockius LLP

(57) ABSTRACT

A multi-stages automatic transmission for vehicle may include first, second, third and fourth planetary gear sets each including first, second and third rotation elements, friction members including first, second, third and fourth clutches and first and second brakes, in which an input shaft may be connected to the first rotation element of the second planetary gear set and the third rotation element of the fourth planetary gear set, and an output shaft may be connected to the second rotation element of the fourth planetary gear set.

7 Claims, 2 Drawing Sheets

(56) References Cited

U.S. PATENT DOCUMENTS

| | | | |
|---|---|---|---|
| 8,663,055 B2 | 3/2014 | Brehmer et al. | |
| 8,715,131 B2 | 5/2014 | Mellet et al. | |
| 8,821,336 B2 | 9/2014 | Wilton et al. | |
| 2005/0003924 A1 | 1/2005 | Tabata et al. | |
| 2008/0070740 A1* | 3/2008 | Gumpoltsberger | F16H 3/66 475/276 |
| 2008/0125269 A1* | 5/2008 | Gumpoltsberger | F16H 3/66 475/276 |
| 2008/0242492 A1 | 10/2008 | Phillips | |
| 2009/0264244 A1 | 10/2009 | Hart | |
| 2011/0045940 A1* | 2/2011 | Gumpoltsberger | F16H 3/66 475/275 |
| 2011/0045942 A1 | 2/2011 | Gumpoltsberger | |
| 2011/0245013 A1* | 10/2011 | Kim | F16H 3/666 475/271 |
| 2012/0172173 A1 | 7/2012 | Wittkopp et al. | |
| 2013/0316870 A1 | 11/2013 | Goleski | |
| 2014/0100073 A1* | 4/2014 | Lee | F16H 3/66 475/277 |
| 2014/0106923 A1 | 4/2014 | Borgerson et al. | |
| 2015/0099603 A1 | 4/2015 | Goleski | |
| 2016/0108995 A1* | 4/2016 | Ji | F16H 3/66 475/276 |

FOREIGN PATENT DOCUMENTS

| | | | |
|---|---|---|---|
| JP | 2013-072464 A | 4/2013 | |
| JP | 2013-190048 A | 9/2013 | |
| JP | 2013-199957 A | 10/2013 | |
| JP | 2013-199959 A | 10/2013 | |
| JP | 2013-204706 A | 10/2013 | |
| JP | 2013-204709 A | 10/2013 | |
| JP | 2013-204717 A | 10/2013 | |
| JP | 2014-035056 A | 2/2014 | |
| JP | 2014-035057 A | 2/2014 | |
| JP | 5530340 B2 | 4/2014 | |
| JP | 2014-105848 A | 6/2014 | |
| JP | 2014-105849 A | 6/2014 | |
| JP | 2014-105850 A | 6/2014 | |
| KR | 10-2012-0119451 A | 10/2012 | |
| KR | 10-2013-0000171 A | 1/2013 | |
| KR | 2013-0031457 A | 3/2013 | |
| KR | 2013-0077146 A | 7/2013 | |
| KR | 10-2014-0046240 A | 4/2014 | |
| KR | 10-1394033 B1 | 5/2014 | |
| KR | 10-1416108 B1 | 7/2014 | |
| KR | 2014-0101859 A | 8/2014 | |
| WO | WO 2013/100620 A1 | 7/2013 | |

OTHER PUBLICATIONS

Christoph Dorr et al., The nine-speed automatic transmission 9G-Tronic of Mercedes-Benz, *ATZ-Automobiltechnische Zeitxchrift*, Jan. 31, 2014, Jan. 2014, pp. 40-45, Germany.

* cited by examiner

FIG.2

| GEAR | C1 | C2 | C3 | C4 | B1 | B2 | GEAR RATIO |
|------|----|----|----|----|----|----|------------|
| 1    |    | ●  | ●  | ●  |    | ●  | 5.118 |
| 2    |    | ●  | ●  |    |    | ●  | 2.912 |
| 3    |    |    | ●  |    | ●  | ●  | 1.811 |
| 4    | ●  |    | ●  |    |    | ●  | 1.678 |
| 5    | ●  |    | ●  |    | ●  |    | 1.435 |
| 6    | ●  |    | ●  |    |    |    | 1.000 |
| 7    | ●  | ●  |    |    | ●  |    | 0.884 |
| 8    | ●  | ●  |    | ●  | ●  |    | 0.811 |
| 9    |    | ●  |    | ●  | ●  |    | 0.761 |
| 10   |    |    | ●  | ●  | ●  |    | 0.680 |
| 11   |    | ●  | ●  | ●  | ●  |    | 0.470 |
| R1   | ●  |    |    | ●  |    | ●  | 3.000 |

MULTI-STAGES AUTOMATIC TRANSMISSION FOR VEHICLE

CROSS-REFERENCE TO RELATED APPLICATION

The present application claims priority to Korean Patent Application No. 10-2014-0151973, filed Nov. 4, 2014, the entire contents of which is incorporated herein for all purposes by this reference.

BACKGROUND OF THE INVENTION

Field of the Invention

Various embodiments of the present invention relate to an automatic transmission for a vehicle, and particularly, to a multi-stages automatic transmission for the vehicle equipped with a gear train capable of implementing 11 forward-speeds and 1 reverse-speed and driving at an optimum point of the engine by multi-stages effect of a transmission.

Description of Related Art

Recently, the technology development need for performance improvement has emerged also similarly in the power train field by being more required need for fuel efficiency improvement due to strengthen of environmental regulations or rising oil prices.

As an appropriate power train technology corresponding to the need, there are an engine downsizing technology and a multi-staging technology of an automatic transmission. The engine downsizing has merits to reduce weight and improve fuel efficiency, and particularly, the automatic transmission multi-staging has merits of securing drivability and competitiveness of fuel efficiency at the same time by available design of an excellent gear ratio in terms of power performance and fuel efficiency by using many shift stages compared to 4-speed (or 5-speed), reverse 1-speed automatic transmission.

However, an automatic transmission is the way in which the more a shift stage is increased the more the number of internal components that make up the automatic transmission is increased by implementing the shift stage with a gear train applied a planetary gear set.

Thus, in the multi-staging of the automatic transmission, above all it is important to achieve drivability and fuel efficiency competitiveness with the gear train structure without increasing the number of internal components rather worsening vehicle mount ability, cost, weight and power transmission efficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an optimal structure of the gear train which may lead to maximum efficiency with fewer components applied to the development of the 11 forward-speeds and 1 reverse-speed automatic transmission to enhance the fuel efficiency effect with the increased shift stages compared to 8 forward stages and 1 reverse stage of the automatic transmission or 9 forward-speeds and 1 reverse-speed automatic transmission.

Various aspects of the present invention are directed to providing a multi-stages automatic transmission for a vehicle that improves quite drivability of the vehicle using an operation point of a low RPM range of an engine by implementing 11 forward-speeds and 1 reverse-speed with the gear train using four planetary gear sets, four clutches and two brakes, and especially, achieves better fuel efficiency improvement by available driving at an optimum point of the engine with multi-staging effect of the automatic transmission.

According to various aspects of the present invention, a multi-stages automatic transmission for vehicle may include first, second, third and fourth planetary gear sets, each including first, second and third rotation elements, friction members including first, second, third and fourth clutches and first and second brakes, wherein an input shaft is connected to the first rotation element of the second planetary gear set and the third rotation element of the fourth planetary gear set, an output shaft is connected to the second rotation element of the fourth planetary gear set, the second rotation element of first planetary gear set is connected to the third rotation element of the second planetary gear set, the third rotation element of the first planetary gear set is connected to the first rotation element of the third planetary gear set, and the first rotation element of the third planetary gear set is connected to the first rotation element of the fourth planetary gear set.

The first break fixes the first rotation element of the first planetary gear set, the second break fixes the second rotation element of the second planetary gear set, the first clutch selectively connects the third rotation element of the second planetary gear set and the third rotation element of the third planetary gear set, the second clutch selectively connects the second rotation element of the second planetary gear set and the third rotation element of the third planetary gear set, the third clutch selectively connects the third rotation element of the second planetary gear set and the second rotation element of the third planetary gear set, and the fourth clutch selectively connects the third rotation element of the third planetary gear set and the second rotation element of the fourth planetary gear set.

The first planetary gear set and the second planetary gear set are made up of a first compound planetary gear set, the third planetary gear set and the fourth planetary gear set are made up of a second compound planetary gear set, a permanent combination path of the first compound planetary gear set and the second compound planetary gear set is formed by the third rotation element of the first planetary gear set and the first rotation element of the third planetary gear set.

The first planetary gear set may include a first sun gear as the first rotation element of the first planetary gear set, a first carrier as the second rotation element of the first planetary gear set, and a first ring gear as the third rotation element of the first planetary gear set, the second planetary gear set may include a second sun gear as the first rotation element of the second planetary gear set, a second carrier as the second rotation element of the second planetary gear set, and a second ring gear as the third rotation element of the second planetary gear set, the third planetary gear set may include a third sun gear as the first rotation element of the third planetary gear set, a third carrier as the second rotation element of the third planetary gear set, and a third ring gear as the third rotation element of the third planetary gear set, and the fourth planetary gear set may include a fourth sun gear as the first rotation element of the fourth planetary gear set, a fourth carrier as the second rotation element of the fourth planetary gear set, and a fourth ring gear as the third rotation element of the fourth planetary gear set.

The first sun gear among the first sun gear, the first carrier and the first ring gear of the first planetary gear set is connected to the first break, the first carrier is fixedly connected to the second ring gear, and the first ring gear is continuously fixedly connected to the third sun gear.

The second sun gear among the second sun gear, the second carrier and the second ring gear of the second planetary gear set is fixedly connected to the input shaft, the second carrier is connected to the second break and selectively connected to the third ring gear through the second clutch, and the second ring gear is fixedly connected to the first carrier, selectively connected to the third ring gear through the first clutch, and selectively connected to the third carrier through the third clutch.

The third sun gear among the third sun gear, the third carrier, and the third ring gear of the third planetary gear set is fixedly connected to the first ring gear and fixedly connected to the fourth sun gear, the third carrier is selectively connected to the second ring gear through the third clutch, and the third ring gear is selectively connected to the second ring gear through first clutch and selectively connected to the fourth carrier through the fourth clutch.

The fourth sun gear among the fourth sun gear, the fourth carrier, the fourth ring gear of the fourth planetary gear set is fixedly connected to the third sun gear, the fourth carrier is continuously fixedly connected to the output shaft and selectively connected to the third ring gear through the fourth clutch, and the fourth ring gear is continuously fixedly connected to the input shaft.

Such the multi-stages automatic transmission of the present invention implements 11 forward-speeds and 1 reverse-speed with the gear train using the four planetary gear sets, the four clutches and the two brakes, thereby realizing an effect that components for 11 forward-speeds and 1 reverse-speed are minimized.

Also, the multi-stages automatic transmission of 11 forward-speeds and 1 reverse-speed of the present invention provides an advantage of a capability to drive at an optimum point of the engine with the multi-stages effect of the transmission. In addition, the present invention has an effect that may respond quickly to a market of the multi-stages automatic transmission in the tendency increasing mounting ratio of more than 7-speed automatic transmission.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational view at each shift stage of friction members applied to a gear train in accordance with an embodiment of the present invention.

Figure 1:
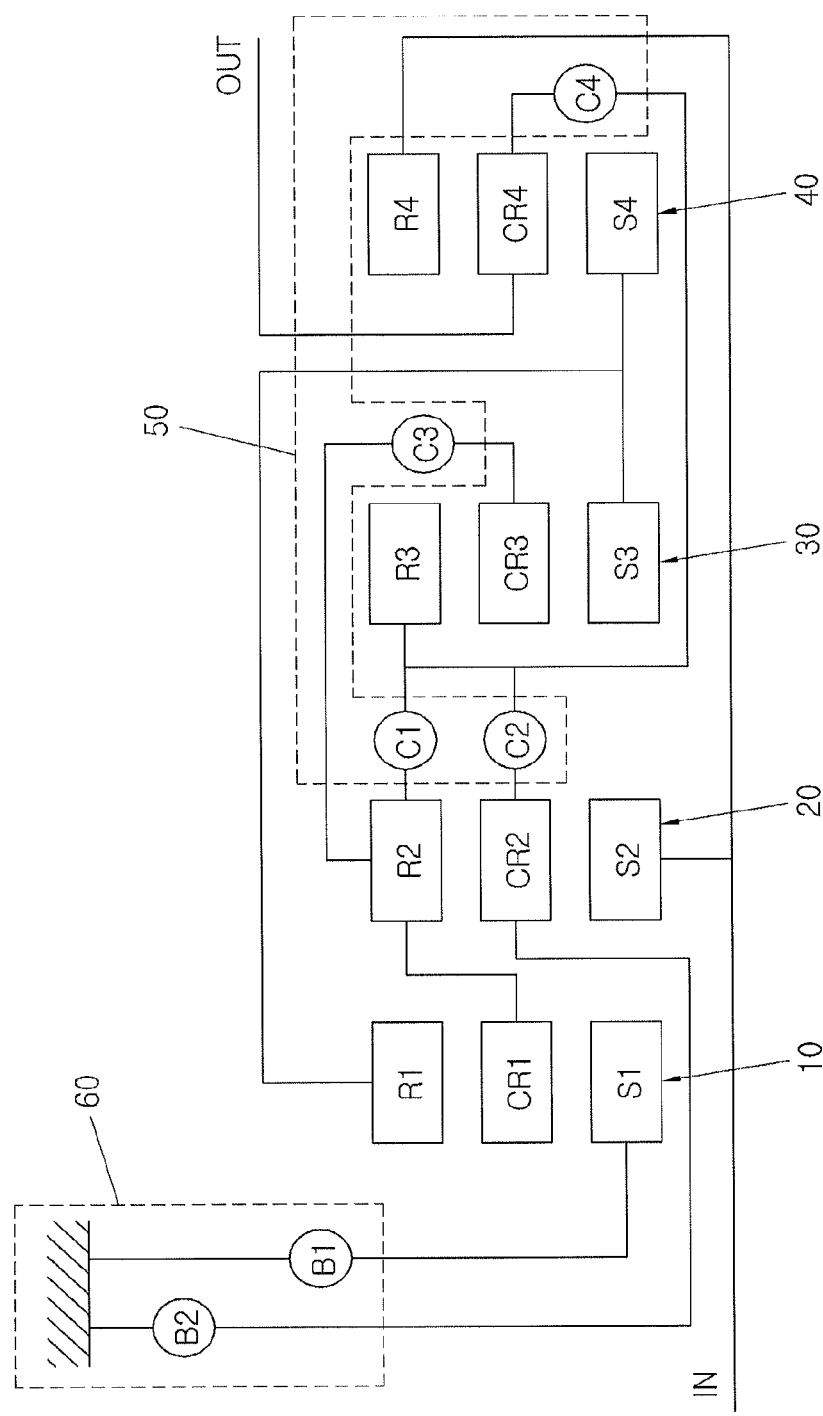
FIG. 1 is a gear train configuration for an exemplary multi-stages automatic transmission for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 shows a configuration of a gear train of a multi-stages automatic transmission for a vehicle according to the present invention. As shown, the gear train may include an input shaft IN as an input member which is associated with a turbine shaft of a torque converter, an output shaft OUT as an output member which is associated with a differential device, planetary gear sets 10, 20, 30 and 40 forming a compound planetary gear device arrayed in the same axial line, and six friction members.

Therefore, the input coming into the input shaft IN may be made by the turbine shaft of the torque converter in which rotational power of an engine crank shaft is torque-converted through the torque converter and then inputted, and the output going from the output shaft OUT is connected to a known differential device which drives driving wheels. The compound planetary gear set may be composed of a first compound planetary gear device and a second compound planetary gear device which are connected by at least one permanent combination path and by at least three selective combination paths.

As an example, the first compound planetary gear device may form a pair with the first and second planetary gear sets 10 and 20, and the second compound planetary gear device may form a pair with the third and fourth planetary gear sets 30 and 40. Further, the four compound planetary gear sets 10, 20, 30 and 40 may be composed of each a first, second and third rotation elements, and the friction members may be configured of a clutch set 50 composed of a first, second, third and fourth clutches C1, C2, C3 and C4 and a brake set 60 composed of a first and second brakes B1 and B2 so that 11 forward-speeds and 1 reverse-speed may be embodied by selective operation connecting the three among six C1, C2, C3, C4, B1, B2.

Specifically, an arrangement of 11 forward-speeds and 1 reverse-speed may be configured as follows.

The first rotation element of the first planetary gear set 10 may be connected to the first brake B1, the second rotation element of the first planetary gear set 10 may be fixedly connected to the third rotation element of the second planetary gear set 20, and the third rotation element of the first planetary gear set 10 may be continuously fixedly connected to the first rotation element of the third planetary gear set 30.

The first rotation element of the second planetary gear set 20 may be fixedly connected to the input shaft IN, the second rotation element of the second planetary gear set 20 may be connected to the second brake B2, and in addition, may be selectively connected to the third rotation element of the third planetary gear set 30 through the second clutch C2, and the third rotation element of the second planetary gear set 20 may be fixedly connected to the second rotation element of the first planetary gear set 10, and in addition, may be selectively connected to the third rotation element of the third planetary gear set 30 through the first clutch C1 and may be selectively connected to the second rotation element of the third planetary gear set 30 through the third clutch C3.

The first rotation element of the third planetary gear set 30 may be fixedly connected to the third rotation element of the first planetary gear set 10, and in addition, may be fixedly connected to the first rotation element of the fourth planetary gear set 40, the second rotation element of the third planetary gear set 30 may be selectively connected to the third rotation element of the second planetary gear set 20 through the third clutch C3, and the third rotation element of the third planetary gear set 30 may be selectively connected to the third rotation element of the second planetary gear set 20 through the first clutch C1, and in addition, may be selectively connected to the second rotation element of the fourth planetary gear set 40 through the fourth clutch C4.

The first rotation element of the fourth planetary gear set 40 may be fixedly connected to the first rotation element of the third planetary gear set 30, the second rotation element of the fourth planetary gear set 40 may be continuously fixedly connected to the output shaft OUT, and in addition, may be selectively connected to the third rotation element of the third planetary gear set 30 through the fourth clutch C4, and the third rotation element of the fourth planetary gear set 40 may be continuously fixedly connected to the input shaft IN.

In accordance with various embodiments of the present invention, the first planetary gear set 10 may include a first sun gear S1 as the first rotation element, a first carrier CR1 as the second rotation element and a first ring gear R1 as the third rotation element. The second planetary gear set 20 may include a second sun gear S2 as the first rotation element, a second carrier CR2 as the second rotation element and a second ring gear R2 as the third rotation element. The third planetary gear set 30 may include a third sun gear S3 as the first rotation element, a third carrier CR3 as the second rotation element and a third ring gear R3 as the third rotation element. The fourth planetary gear set 40 may include a fourth sun gear S4 as the first rotation element, a fourth carrier CR4 as the second rotation element and a fourth ring gear R4 as the third rotation element.

Therefore, the first sun gear S1 may be connected to the first brake B1, the first carrier CR1 may be fixedly connected to the second ring gear R2, and the first ring gear R1 may be continuously fixedly connected to the third sun gear S3. Further, the second sun gear S2 may be fixedly connected to the input shaft IN, the second carrier CR2 may be connected to the second brake B2, and in addition, may be selectively connected to the third ring gear R3 through the second clutch C2, and the second ring gear R2 may be fixedly connected to the first carrier CR1, and in addition, may be selectively connected to the third ring gear R3 through the first clutch C1, and the third carrier CR3 through the third clutch C3.

Besides, the third sun gear S3 may be fixedly connected to the first ring gear R1, and in addition, may be fixedly connected to the fourth sun gear S4, the third carrier CR3 may be selectively connected to the second ring gear R2 through the third clutch C3, and the third ring gear R3 may be selectively connected to the second ring gear R2 through the first clutch C1, and in addition, may be selectively connected the fourth carrier CR4 through the fourth clutch C4. Further, the fourth sun gear S4 may be fixedly connected to the third sun gear S3, the fourth carrier CR4 may be continuously fixedly connected to the output shaft OUT, and in addition, may be selectively connected to the third ring gear R3 through the fourth clutch C4, and the fourth ring gear R4 may be continuously fixedly connected to the input shaft IN.

Due to this structure, a permanent combination path of the first compound planetary gear device composed of the first and second planetary gear sets 10 and 20 and the second compound planetary gear device composed of the third and fourth planetary gear sets 30 and 40 may be formed with the first ring gear R1 and the third sun gear S3. Therefore, the second sun gear S2 and the fourth ring gear R4 may act as the input element of the gear train and the fourth carrier CR4 may act as the output element Further, the first brake B1 may be connected to the first sun gear S1, the second brake B2 may be connected to the second carrier CR2, the first clutch C1 may selectively connect the second ring gear R2 to the third ring gear R3, the second clutch C2 may selectively connect the second carrier CR2 to the third ring gear R3, the third clutch C3 may selectively connect the second ring gear R2 to the third carrier CR3, the fourth clutch C4 may selectively connect the third ring gear R3 to the fourth carrier CR4. The first, second, third and fourth clutches C1, C2, C3 and C4 and the first and second breaks B1 and B2 may be composed to a multi-plates type hydraulic friction coupling unit friction-fitted by hydraulic pressure such as the conventional manner.

On the other hand, FIG. 2 is operational elements at each shift stage of the friction members applied to a gear train in accordance with various embodiments of the present invention. As shown, the first, second, third and fourth clutches C1, C2, C3 and C4 and the first and second breaks B1 and B2 may implement each shift stage by combining a total of three operating elements, thereby reducing the number of the inoperative friction elements, so that the friction drag loss may be reduced. This indicates to improve the power transmitting efficiency of the transmission and ultimately contribute to improving fuel efficiency of the vehicle.

At the forward 1-speed, the third clutch C3, the fourth clutch C4 and the second brake B2 are operated. Then, the operating of the third clutch C3 connects the second ring gear R2 with the third carrier CR3, the operating of the fourth clutch C4 connects the fourth carrier CR4 with the third ring gear R3 and the operating of the second brake B2 allows the second carrier CR2 to fix. Due to this, the input of the input shaft IN is transmitted to the second sun gear S2 and the fourth ring gear R4 and the output of the forward 1-speed is made at the fourth carrier CR4 of the fourth planetary gear set 40 and, the 1-speed output of the fourth carrier CR4 is transmitted to the differential device through the output shaft OUT, thereby the shifting of the forward 1-speed is completed.

At the forward 2-speed, the second and third clutches C2 and C3 and the second brake B2 are operated by releasing of the fourth clutch C4 and operating of the second clutch C2 in the state of the forward 1-speed. Then, the releasing of the fourth clutch C4 releases the fourth carrier CR4 and the third ring gear R3, the operating of the second clutch C2 connects the second carrier CR2 with the third ring gear R3, and the third clutch C3 and the second brake B2 remain in the operational state. Due to this, the output of the forward 2-speed is made at the fourth carrier CR4 of the fourth planetary gear set 40 and the 2-speed output of the fourth carrier CR4 is transmitted to the differential device through the output shaft OUT, thereby the shifting of the forward 2-speed is completed.

At the forward 3-speed, the third clutch C3 and the first and second brakes B1, B2 are operated by releasing of the second clutch C2 and operating of the first brake B1 in the state of the forward 2-speed. Then, the releasing of the second clutch C2 disconnects the second carrier CR2 and the third ring gear R3, the operating of the first brake B1 fixes the first sun gear S1, and the third clutch C3 and the second brake B2 remain in the operational state. Due to this, the output of the forward 3-speed is made at the fourth carrier CR4 of the fourth planetary gear set 40 and the 3-speed output of the fourth carrier CR4 is transmitted to the differential device through the output shaft OUT, thereby the shifting of the forward 3-speed is completed.

At the forward 4-speed, the first and third clutches C1 and C3 and the second brake B2 are operated by releasing of the first brake B1 and operating of the first clutch C1 in the state of the forward 3-speed. Then, the releasing of the first brake B1 releases the first sun gear S1, the operating of the first clutch C1 connects the second ring gear R2 with the third ring gear R3, and the third clutch C3 and the second brake B2 remain operational state. Due to this, the output of the forward 4-speed is made at the fourth carrier CR4 of the fourth planetary gear set 40 and the 4-speed output of the fourth carrier CR4 is transmitted to the differential device through the output shaft OUT, thereby the shifting of the forward 4-speed is completed.

At the forward 5-speed, the first and third clutches C1 and C3 and the first brake B1 are operated by releasing of the second brake B2 and operating of the first brake B1 in the state of the forward 4-speed. Then, the releasing of the second brake B2 releases the second carrier CR2, the operating of the first brake B1 fixes the first sun gear S1, and the first and third clutches C1 and C3 remain operational state. Due to this, the output of the forward 5-speed is made at the fourth carrier CR4 of the fourth planetary gear set 40 and the 5-speed output of the fourth carrier CR4 is transmitted to the differential device through the output shaft OUT, thereby the shifting of the forward 5-speed is completed.

At the forward 6-speed, the first, second and third clutches C1, C2 and C3 are operated by releasing of the first brake B1 and operating of the second clutch C2 in the state of the forward 5-speed. Then, the releasing of the first brake B1 releases the first sun gear S1, the operating of the second clutch C2 connects the second carrier CR2 with the third ring gear R3, and the first and third clutches C1 and C3 remain operational state. Due to this, the output of the forward 6-speed is made at the fourth carrier CR4 of the fourth planetary gear set 40 and the 6-speed output of the fourth carrier CR4 is transmitted to the differential device through the output shaft OUT, thereby the shifting of the forward 6-speed is completed.

At the forward 7-speed, the first and second clutches C1 and C2 and the first brake B1 are operated by releasing of the third clutch C3 and operating the first brake B1 in the state of the forward 6-speed. Then, the releasing of the third clutch C3 disconnects the second ring gear R2 and the third carrier CR3, the operating of the first brake B1 fixes the first sun gear S1, and the first and second clutches C1 and C2 remain operational state. Due to this, the output of the forward 7-speed is made at the fourth carrier CR4 of the fourth planetary gear set 40 and the 7-speed output of the fourth carrier CR4 is transmitted to the differential device through the output shaft OUT, thereby the shifting of the forward 7-speed is completed.

At the forward 8-speed, the first and fourth clutches C1 and C4 and the first brake B1 are operated by releasing of the second clutch C2 and operating of the fourth clutch C4 in the state of the forward 7-speed. Then, the releasing of the second clutch C2 disconnects the second carrier CR2 and the third ring gear R3, the operating of the fourth clutch C4 connects the fourth carrier CR4 with the third ring gear R3, and the first clutch C1 and the first brake B1 remain operational state. Due to this, the output of the forward 8-speed is made at the fourth carrier CR4 of the fourth planetary gear set 40 and the 8-speed output of the fourth carrier CR4 is transmitted to the differential device through the output shaft OUT, thereby the shifting of the forward 8-speed is completed.

At the forward 9-speed, the second and fourth clutches C2 and C4 and the first brake B1 are operated by releasing of the first clutch C1 and operating of the second clutch C2 in the state of the forward 8-speed. Then, the releasing of the first clutch C1 disconnects the second ring gear R2 and the third ring gear R3, the operating of the second clutch C2 connects the second carrier CR2 with the third ring gear R3, and the fourth clutch C4 and the first brake B1 remain operational state. Due to this, the output of the forward 9-speed is made at the fourth carrier CR4 of the fourth planetary gear set 40 and the 9-speed output of the fourth carrier CR4 is transmitted to the differential device through the output shaft OUT, thereby the shifting of the forward 9-speed is completed.

At the forward 10-speed, the third and fourth clutches C3 and C4 and the first brake B1 are operated by releasing of the second clutch C2 and operating of the third clutch C3 in the state of the forward 9-speed. Then, the releasing of the second clutch C2 disconnects the second carrier CR2 and the third ring gear R3, the operating of the third clutch C3 connects the second ring gear R2 with the third carrier CR3, and the fourth clutch C4 and the first brake B1 remain operational state. Due to this, the output of the forward 10-speed is made at the fourth carrier CR4 of the fourth planetary gear set 40 and the 10-speed output of the fourth carrier CR4 is transmitted to the differential device through the output shaft OUT, thereby the shifting of the forward 10-speed is completed.

At the forward 11-speed, the second and third clutches C2 and C3 and the first brake B1 are operated by releasing of the fourth clutch C4 and operating of the second clutch C2 in the state of the forward 10-speed. Then, the releasing of the fourth clutch C4 releases the fourth carrier CR4 and the third ring gear R3, the operating of the second clutch C2 connects the second carrier CR2 with the third ring gear R3, and the third clutch CR3 and the first brake B1 remain operational state. Due to this, the output of the forward 11-speed is made at the fourth carrier CR4 of the fourth planetary gear set 40 and the 11-speed output of the fourth carrier CR4 is transmitted to the differential device through the output shaft OUT, thereby the shifting of the forward 11-speed is completed.

At the 1 reverse-speed, the first and fourth clutches C1 and C4 and the second brake B2 are operated. Then, the operating of the first clutch C1 connects the second ring gear R2 with the third ring gear R3, the operating of the fourth clutch C4 connects the fourth carrier CR4 with the third ring gear R3 and the operating of the second brake B2 fixes the second carrier CR2. Due to this, the input of the input shaft IN is transmitted to the second sun gear S2 and the fourth ring gear R4, and the output of the 1 reverse-speed is made at the fourth carrier CR4 of the fourth planetary gear set 40 and the 1 reverse-speed output of the fourth carrier CR4 is transmitted to the differential device through the output shaft OUT, thereby the shifting of the 1 reverse-speed is completed.

As described above, the multi-stages automatic transmission for the vehicle according to various embodiment of the present invention includes a gear train composed of four planetary gear sets 10, 20, 30 and 40, six friction members made of the first, second, third and fourth clutches C1, C2, C3 and C4 and the first and second brakes B1 and B2, implements forward 11-speed and 1 reverse-speed with various array of the first, second, third and fourth clutches C1, C2, C3 and C4 on rotation elements, in particular, implements a sequential shift scheme which takes one after loosen one of the friction members C1, C2, C3, C4, B1 and B2.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A multi-stage automatic transmission for vehicle comprising:
   first, second, third and fourth planetary gear sets, each including first, second and third rotation elements;
   friction members including first, second, third and fourth clutches and first and second brakes,
   wherein an input shaft is connected to the first rotation element of the second planetary gear set and the third rotation element of the fourth planetary gear set, an output shaft is connected to the second rotation element of the fourth planetary gear set, the second rotation element of first planetary gear set is connected to the third rotation element of the second planetary gear set, the third rotation element of the first planetary gear set is connected to the first rotation element of the third planetary gear set, and the first rotation element of the third planetary gear set is connected to the first rotation element of the fourth planetary gear set, and
   wherein the first brake fixes the first rotation element of the first planetary gear set, the second brake fixes the second rotation element of the second planetary gear set, the first clutch selectively connects the third rotation element of the second planetary gear set and the third rotation element of the third planetary gear set, the second clutch selectively connects the second rotation element of the second planetary gear set and the third rotation element of the third planetary gear set, the third clutch selectively connects the third rotation element of the second planetary gear set and the second rotation element of the third planetary gear set, and the fourth clutch selectively connects the third rotation element of the third planetary gear set and the second rotation element of the fourth planetary gear set.

2. The multi-stage automatic transmission for the vehicle of claim 1, wherein the first planetary gear set and the second planetary gear set are made up of a first compound planetary gear set, the third planetary gear set and the fourth planetary gear set are made up of a second compound planetary gear set, a permanent combination path of the first compound planetary gear set and the second compound planetary gear set is formed by the third rotation element of the first planetary gear set and the first rotation element of the third planetary gear set.

3. The multi-stage automatic transmission for the vehicle of claim 1, wherein the first planetary gear set includes a first sun gear as the first rotation element of the first planetary gear set, a first carrier as the second rotation element of the first planetary gear set, and a first ring gear as the third rotation element of the first planetary gear set,
   the second planetary gear set includes a second sun gear as the first rotation element of the second planetary gear set, a second carrier as the second rotation element of the second planetary gear set, and a second ring gear as the third rotation element of the second planetary gear set,
   the third planetary gear set includes a third sun gear as the first rotation element of the third planetary gear set, a third carrier as the second rotation element of the third planetary gear set, and a third ring gear as the third rotation element of the third planetary gear set, and
   the fourth planetary gear set includes a fourth sun gear as the first rotation element of the fourth planetary gear set, a fourth carrier as the second rotation element of the fourth planetary gear set, and a fourth ring gear as the third rotation element of the fourth planetary gear set.

4. The multi-stage automatic transmission for the vehicle of claim 3, wherein the first sun gear among the first sun gear, the first carrier, and the first ring gear of the first planetary gear set, is connected to the first brake, the first carrier is fixedly connected to the second ring gear, and the first ring gear is continuously fixedly connected to the third sun gear.

5. The multi-stage automatic transmission for the vehicle of claim 3, wherein the second sun gear among the second sun gear, the second carrier and the second ring gear of the second planetary gear set is fixedly connected to the input shaft, the second carrier is connected to the second brake and selectively connected to the third ring gear through the second clutch, and the second ring gear is fixedly connected to the first carrier, selectively connected to the third ring gear through the first clutch, and selectively connected to the third carrier through the third clutch.

6. The multi-stage automatic transmission for the vehicle of claim 3, wherein the third sun gear among the third sun gear, the third carrier, and the third ring gear of the third planetary gear set is fixedly connected to the first ring gear and fixedly connected to the fourth sun gear, the third carrier is selectively connected to the second ring gear through the third clutch, and the third ring gear is selectively connected to the second ring gear through first clutch and selectively connected to the fourth carrier through the fourth clutch.

7. The multi-stage automatic transmission for the vehicle of claim 3, wherein the fourth sun gear among the fourth sun gear, the fourth carrier, the fourth ring gear of the fourth planetary gear set is fixedly connected to the third sun gear, the fourth carrier is continuously fixedly connected to the output shaft and selectively connected to the third ring gear through the fourth clutch, and the fourth ring gear is continuously fixedly connected to the input shaft.

* * * * *